(12) United States Patent
Wick et al.

(10) Patent No.: US 12,502,138 B2
(45) Date of Patent: Dec. 23, 2025

(54) SYSTEMS AND METHODS FOR DETERMINING IMAGING SUBJECT ORIENTATION

(71) Applicants: CAMERAD TECHNOLOGIES, Decatur, GA (US); THE UAB RESEARCH FOUNDATION, Birmingham, AL (US)

(72) Inventors: Carson Arthur Wick, Decatur, GA (US); Srini Tridandapani, Decatur, GA (US); Pamela T. Bhatti, Decatur, GA (US)

(73) Assignees: CAMERAD TECHNOLOGIES, Decatur, GA (US); THE UAB RESEARCH FOUNDATION, Birmingham, AL (US)

( * ) Notice: Subject to any disclaimer, the term of this patent is extended or adjusted under 35 U.S.C. 154(b) by 192 days.

(21) Appl. No.: 18/345,347

(22) Filed: Jun. 30, 2023

(65) Prior Publication Data

US 2024/0008819 A1    Jan. 11, 2024

Related U.S. Application Data

(60) Provisional application No. 63/360,000, filed on Jul. 11, 2022.

(51) Int. Cl.
| | |
|---|---|
| *A61B 5/00* | (2006.01) |
| *G06T 7/70* | (2017.01) |
| *G06V 10/74* | (2022.01) |
| *G16H 30/20* | (2018.01) |
| *G16H 30/40* | (2018.01) |

(52) U.S. Cl.
CPC .............. *A61B 5/70* (2013.01); *G06T 7/70* (2017.01); *G06V 10/761* (2022.01); *G16H 30/20* (2018.01); *G16H 30/40* (2018.01)

(58) Field of Classification Search
CPC ... A61B 5/70; G06T 7/70; G06T 2207/10024; G06T 2207/10116; G06T 2207/20084; G06T 2207/30196; G06V 10/761; G06V 10/82; G06V 2201/03; G06V 40/60; G16H 30/20; G16H 30/40
See application file for complete search history.

(56) References Cited

U.S. PATENT DOCUMENTS

| | | | | |
|---|---|---|---|---|
| 2009/0154910 | A1* | 6/2009 | Weinberg | H04N 23/633 396/53 |
| 2018/0315236 | A1* | 11/2018 | Case | G01N 23/046 |
| 2020/0205748 | A1* | 7/2020 | Pautsch | A61B 6/032 |
| 2020/0219255 | A1* | 7/2020 | Wick | A61B 6/032 |
| 2021/0074407 | A1* | 3/2021 | Dane | A61B 5/7425 |
| 2021/0271931 | A1* | 9/2021 | Younis | G16H 30/20 |
| 2021/0312659 | A1* | 10/2021 | Sommer | A61B 5/742 |
| 2022/0151573 | A1* | 5/2022 | Sugahara | A61B 6/08 |

* cited by examiner

*Primary Examiner* — Michael J Carey
*Assistant Examiner* — Zainab Mohammed Aldarraji
(74) *Attorney, Agent, or Firm* — Workman Nydegger

(57) ABSTRACT

A system for determining subject orientation includes a medical imaging sensor configured to capture medical imagery of an imaging subject. The system also includes one or more interoceptive sensors, which are configured to obtain interoceptive sensor data indicative of an orientation associated with the system.

19 Claims, 8 Drawing Sheets

800

802 Determining An Imaging Subject Orientation Of An Imaging Subject Based Upon Interoceptive Sensor Data Obtained By An Interoceptive Sensor Of A System, The System Further Comprising A Medical Imaging Sensor Configured To Capture Medical Imagery Of The Imaging Subject

804 Accessing An Indication Of An Intended Imaging Subject Orientation, The Intended Imaging Subject Orientation Being Selected To Be Embodied By The Imaging Subject To Be Imaged During An Imaging Session Using The Medical Imaging Sensor

806 In Response To Determining A Discrepancy Between The Intended Imaging Subject Orientation And The Imaging Subject Orientation, Causing Presentation Of A Notification On A User Interface

808 In Response To Determining That No Discrepancies Exist Between The Intended Imaging Subject Orientation And The Imaging Subject Orientation, Permit The Imaging Session To Proceed Or Commence

*FIG. 8*

SYSTEMS AND METHODS FOR DETERMINING IMAGING SUBJECT ORIENTATION

CROSS-REFERENCE TO RELATED APPLICATIONS

This application claims priority to U.S. Provisional Patent Application No. 63/360,000, filed on Jul. 11, 2022, and entitled "SYSTEMS AND METHODS FOR DETERMINING IMAGING SUBJECT ORIENTATION", the entirety of which is incorporated herein by reference.

STATEMENT REGARDING FEDERALLY SPONSORED RESEARCH

The invention was made with government support under Award Number 1853142 awarded by National Science Foundation. The government may have certain rights in the invention.

BACKGROUND

Advances in computing technology have resulted in a concomitant advance in medical device technologies, including within the field of diagnostic medicine. Particularly, the past century has demonstrated significant advances in medical imaging devices. Such advances have been hallmarked by the improvement and advent of new radiologic devices, such as radiography, computed tomography (CT), magnetic resonance imaging (MRI), and other radiologic imaging systems that allow for the non-invasive viewing and exploration of internal structures of the body. These medical imaging technologies allow physicians and clinicians to better document, diagnose, and treat pathologies.

Unfortunately, medical images alone do not always provide the information necessary to efficiently analyze medical problems. By failing to provide details associated with the patient during the imaging process, the medical images themselves may easily be misinterpreted. This may result in certain misdiagnosis of disease or errors associated with medical conditions. Furthermore, failure to properly associate a medical image study with other patient factors may propagate to future imaging studies and negatively affect patient management decisions.

Patient information such as the patient's orientation (e.g., whether the patient was lying down or sitting up) during the imaging process can be important to enable proper interpretation of medical imagery. An example where the patient's orientation may affect patient care decisions is in the case of a leaked bowel, where air is present under the diaphragm. Symptoms of a leaked bowel can be readily observable in medical images when the patient is upright during the imaging process or lying on the side (in a "cross-table lateral position"). However, if the patient was lying horizontally flat either on the back (supine) or on the abdomen (prone) during the imaging process, air under the diaphragm (in the case of upright images) or along the sides of the abdomen (in the case of cross-table lateral images) is often not readily visible in the medical imagery. Without an accurate understanding of the patient's orientation during imaging, medical practitioners (e.g., radiologists) may fail to properly consider whether leaked bowel is a potential diagnosis for the patient. For example, without an understanding of the patient's orientation during imaging, a medical practitioner may improperly conclude that a patient is not experiencing leaked bowel due to an absence of a visible air gap under the diaphragm in the medical imagery, even where the patient was imaged lying flat on the back or on the abdomen (rendering the air gap imperceptible in the medical imagery).

Accordingly, there is a need for improved techniques for determining and/or conveying patient orientation information.

The subject matter described herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed to systems, devices, and methods for determining subject orientation and preventing errors associated with subject orientation.

In one aspect, a system for determining subject orientation includes a medical imaging sensor configured to capture medical imagery of an imaging subject. The system also includes an interoceptive sensor, which is configured to obtain interoceptive sensor data indicative of an orientation associated with the system.

In one aspect, a method for determining imaging subject orientation includes (i) capturing medical imagery of an imaging subject using a medical imaging sensor of a system, (ii) determining an imaging subject orientation based upon interoceptive sensor data obtained by an interoceptive sensor of the system, the interoceptive sensor data being indicative of an orientation associated with the system, and (iii) causing the medical imagery to be stored in association with the imaging subject orientation.

In another aspect, a method for preventing errors in medical imagery includes (i) determining an imaging subject orientation of an imaging subject based upon interoceptive sensor data obtained by an interoceptive sensor of a system, the system further comprising a medical imaging sensor configured to capture medical imagery of the imaging subject, (ii) accessing an indication of an intended imaging subject orientation, the intended imaging subject orientation being selected to be embodied by the imaging subject to be imaged during an imaging session using the medical imaging sensor, and (iii) in response to determining a discrepancy between the intended imaging subject orientation and the imaging subject orientation, causing presentation of a notification on a user interface.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which:

FIG. 8 illustrates an example flow diagram depicting acts associated with preventing errors in medical imagery.

DETAILED DESCRIPTION

Figure 1:
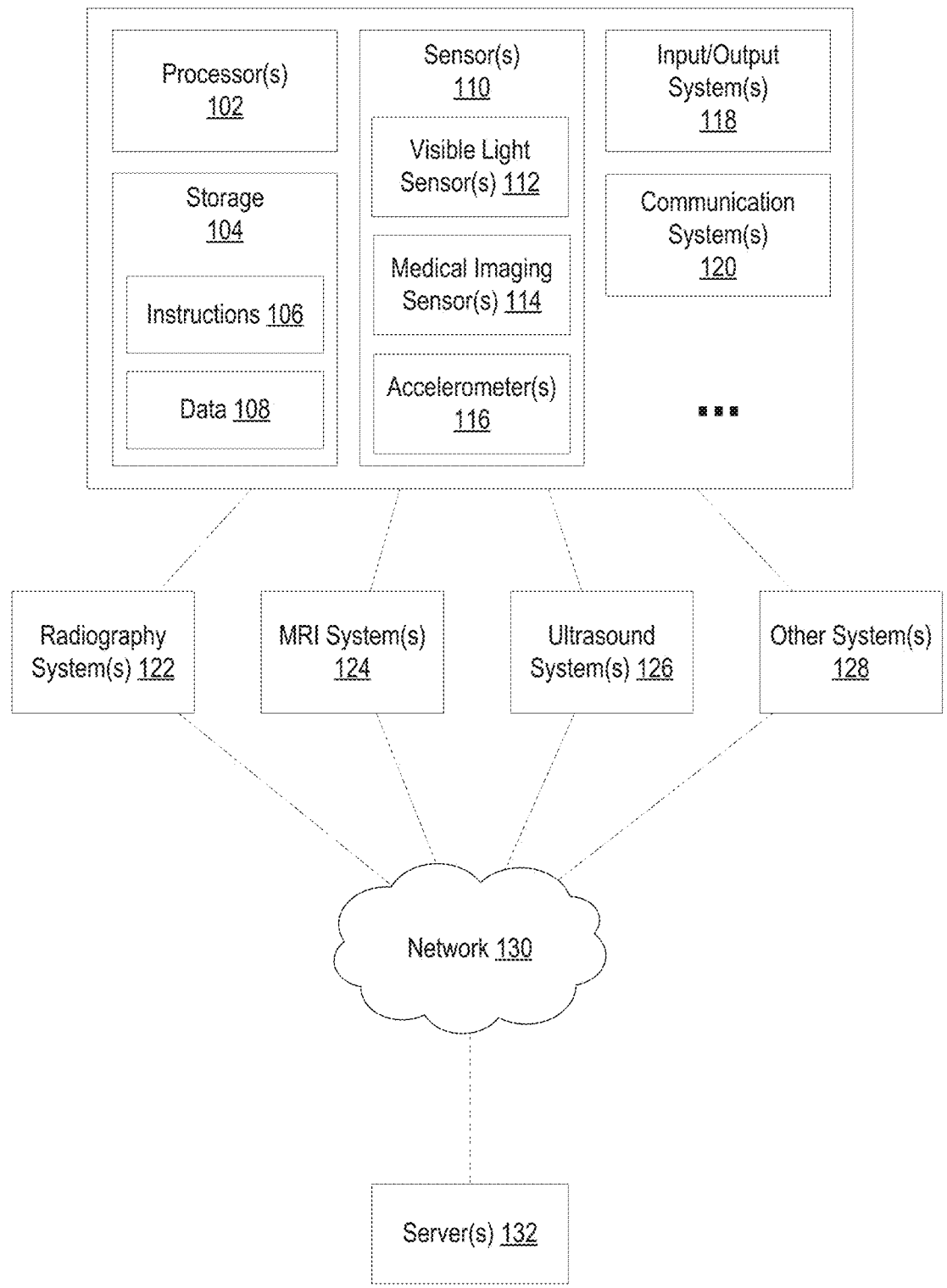
FIG. 1 illustrates example components of example systems that may comprise or implement the disclosed embodiments.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the particular example terminology used herein is for the purpose of describing the embodiments and is not necessarily intended to limit the scope of the claimed invention.

As briefly noted above, even with advances in the field of medical imaging, numerous errors still exist. One of these errors includes the misinterpretation of medical images based on subject orientation. After the medical image is taken, symptoms of certain medical conditions may be perceived differently based on whether the patient was lying down flat, on one side, or sitting up during medical imaging. An example is a leaked bowel mentioned above, where the free air below the diaphragm is typically not visible when a patient is lying down during imaging, and where the free air is typically visible when a patient is sitting up during imaging.

Some techniques exist for communicating patient orientation during medical imaging to future interpreters of the captured medical imagery. For example, radiopaque markers may be positioned adjacent to patients that include markings indicating patient orientation. Other techniques involve medical practitioners providing user input indicating patient orientation during imaging. In some instances, an intended orientation for medical imaging is communicated to a medical imaging technologist prior to an imaging session, and the technologist is expected to comply with the intended orientation during the imaging session. These existing techniques, however, are subject to human error. For example, a technologist may fail to place the correct orientation markers adjacent to a patient prior to imaging, or a technologist may neglect to enter (or may incorrectly enter) orientation information for an imaging session, or a technologist may fail to properly comply with patient orientation instructions for an imaging session. In some instances, the correct marker may be placed on the radiographic sensor (imaging plate); however, this marker may be cropped out of the x-ray beam and may not be included in the x-ray image.

These types of errors based on missing or incorrect subject orientation information can have serious consequences, such as in the case of leaked bowel as discussed above. Undiagnosed or misdiagnosed medical conditions may cause medical practitioners to fail to provide adequate care to patients and/or may cause more medical images to be required (leading to otherwise avoidable exposure to radiation). Beyond the patient's wellbeing, unnecessary medical imaging increases costs for using the imaging device and for the technologist's time in acquiring the images and for the radiologist's time for interpreting new images. Therefore, absent or improper indications of the patient orientation during imaging can be unsafe for patients and/or inefficient for medical practices.

The present disclosure relates at least to systems, methods, and devices for preventing incorrect medical image interpretation due to lack of subject orientation information. Medical images may be taken using various types of medical imaging devices such as radiography systems. Subject orientation (and/or imaging device orientation) may be determined by an interoceptive sensor (e.g., an accelerometer) associated with the medical imaging device (directly or indirectly). The embodiments disclosed herein may be implemented at the point of medical image acquisition, or prior to the point of medical image acquisition, to enable pro-active prevention of misdiagnosis errors based on subject orientation. By preventing subject orientation errors from being stored or recorded within patient databases, the disclosed embodiments may prevent many of the inefficiencies and/or dangers associated with reliance on wrong or missing orientation information (e.g., unnecessary radiation exposure, waste of imaging resources/time, medical misdiagnosis, medical mistreatment, and/or others).

At least some disclosed embodiments are directed to preventing misinterpretation of medical images by associating subject orientation with the appropriate medical image. This may be done in a variety of ways including text files, directly altering the medical image to include the subject orientation, using meta-data, or other appropriate means for association of multiple forms of data in a data repository. By associating subject orientation directly to the medical image, the physician (for e.g., a radiologist) can easily interpret the medical image correctly, potentially saving time, avoiding costs of taking additional medical images, and preventing the patient from undergoing more radiation to capture more medical images.

At least some disclosed embodiments are directed to preventing wrong patient orientation of medical images proactively. For example, if a patient needs to be sitting up to properly image a medical condition, an intended subject orientation can be indicated. Before capturing the medical image, the disclosed system can inform the technologist of the intended subject orientation and/or determine whether the current orientation of the medical imaging system is commensurate with the intended subject orientation. If the subject orientation and/or medical imaging device orientation is not commensurate with the intended subject orientation or intended device orientation, the medical image process can be stopped or prevented until the subject orientation is corrected (or the technologist can be automatically notified of the error). In contrast, if the detected subject orientation and/or medical imaging device orientation comply with the intended subject orientation or intended device orientation, the disclosed system may allow the imaging process to proceed (or may notify the technologist that it is safe to proceed). By proactively preventing errors, the disclosed system may reduce the need for unnecessary medical imaging of the patient which results in exposing the patient to radiation. Also, the disclosed system may ensure the medical image is taken correctly, which may reduce workload for medical image technicians and/or save overall costs.

The techniques disclosed herein may facilitate various benefits, such as preventing erroneous diagnoses. For instance, misdiagnosis of leaked bowel may be prevented or mitigated by implementing the disclosed techniques for preventing acquisition of images that fail to comply with imaging protocols (e.g., target or intended imaging orientation) and/or for recording imaging apparatus and/or subject orientation for presentation to a reviewing physician. The techniques discussed herein may facilitate benefits in other domains, such as ultrasound imaging. For example, recording the orientation of an ultrasound probe (transducer) during imaging for presentation to an interpreting physician may assist the interpreting physician in correctly diagnosing certain medical conditions. For instance, ultrasound transducer orientation information may be recorded and associated with images of a patient's gallbladder that capture the patient's gallbladder while the patient is in the left side down, right side down, supine, and/or prone position(s). The ultrasound transducer orientation information may be presented to a reviewing/interpreting physician in association with corresponding ultrasound images. The ultrasound transducer orientation information, when presented with corresponding ultrasound images, may provide the reviewing/interpreting physician with an improved basis for making diagnostic determinations. For example, by assessing combinations of ultrasound transducer orientation information and ultrasound image data, a reviewing physician may determine whether an object present in the patient's gallbladder moves in a gravity-dependent manner (e.g., where the object appears in different positions for different ultrasound transducer orientations, indicating that the object is likely a gallstone) or not (e.g., indicating a possibility of a gallbladder polyp or mass).

Having just described some various high-level features and benefits of the disclosed embodiments, attention will now be directed to FIGS. 1 through 8. These Figures illustrate various conceptual representations, components, architectures, methods, and supporting illustrations related to the disclosed embodiments.

Example Systems and Techniques for Determining Imaging Subject Orientation

FIG. 1 illustrates example components of example systems that may comprise or implement the disclosed embodiments. For example, the components illustrated in FIG. 1 include processor(s) 102, storage 104, sensor(s) 110, input/output system(s) 118 (I/O system(s) 118), and communication system(s) 120. Although FIG. 1 illustrates particular components, one will appreciate, in view of the present disclosure, that systems for implementing the disclosed embodiments may comprise any number of additional or alternative components (as indicated by the ellipsis).

The processor(s) 102 may comprise one or more sets of electronic circuitries that include any number of logic units, registers, and/or control units to facilitate the execution of the computer-interpretable instructions (e.g., instructions that form a computer program). Such computer-interpretable instructions may be stored within storage 104. The storage 104 may comprise physical system memory and may be volatile, non-volatile, or some combination thereof. Furthermore, storage 104 may comprise local storage, remote storage (e.g., accessible via communication system(s) 120 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by the way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with detecting, storing, and/or communicating patient orientation for medical imagery. The actions may rely at least in part on data 108 stored on 104 in a volatile and/or non-volatile manner.

In some instances, the actions may rely at least in part on communication system(s) 120 for receiving data from remote system(s), which may include, for example, separate systems or devices, sensors, servers, cloud resources/services, and/or others. The communications system(s) 120 may comprise any combination of software or hardware components that are operable to facilitate communication between on-system components/devices and/or with off-system components/devices. For example, the communications system(s) 120 may comprise ports, buses, or other physical connection apparatuses for communicating with other devices/components. Additionally, or alternatively, the communications system(s) 120 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system for implementing the disclosed embodiments may comprise or be in communication with I/O system(s) 118. I/O system(s) 118 may include any type of input or output device such as, by way of non-limiting example, a touch screen, a mouse, a keyboard, a controller, and/or others, without limitation. For example, the I/O system(s) 118 may include a display system that may comprise any number of display panels, optics, laser scanning display assemblies, and/or other components.

Furthermore, FIG. 1 illustrates that a system for implementing the disclosed embodiments may comprise or be in communication with sensor(s) 110. Sensor(s) 110 may comprise any device for capturing or measuring data representative of perceivable or detectable phenomena. By way of non-limiting example, the sensor(s) 110 may comprise one or more image sensors, interoceptive sensor (e.g., accelerometer(s) 116, gyroscopes, magnetometers), microphones, thermometers, barometers, and/or others. The accelerometer(s) 116 may comprise microelectromechanical accelerometers, mass-spring accelerometers, etc. and may be used to measure orientation (e.g., based on the direction of weight changes). FIG. 1 indicates that various types of image sensors are within the scope of the present disclosure. For instance, FIG. 1 depicts that the sensor(s) 110 may comprise visible light sensor(s) 112 and medical imaging sensor(s) 114. Visible light sensor(s) 112 may comprise charge-coupled device (CCD) image sensors, complementary metal-oxide-semiconductor (CMOS) image sensors, single photon avalanche diode (SPAD) image sensors, and/or any other type of image sensor configured to detect photons within (but not limited to) at least a portion of the visible spectrum (e.g., between about 380 nm and about 750 nm) to capture imagery (e.g., intensity or grayscale images, RGB images, and/or others).

Medical imaging sensor(s) 114 may comprise any type of device for capturing images of patients within a medical use context (e.g., medical assessment/diagnostic purposes, treatment assessment purposes, etc.). Medical imaging sensor(s) 114 may include, by way of non-limiting example, radiography devices (e.g., x-ray devices, computer tomography (CT) devices, positron emission tomography (PET) devices, nuclear medicine imaging devices, and/or others), magnetic resonance imaging (MRI) devices, ultrasound devices, and/or others.

The components shown in FIG. 1 may be implemented in various types and/or combinations of systems/devices to facilitate prevention of medical imaging errors in accordance with the present disclosure. For example, any number of the components discussed hereinabove with reference to FIG. 1 may be implemented in association with radiography system(s) 122, MRI system(s) 124, ultrasound system(s) 126, and/or other system(s) 128. For example, radiography system(s) 122 may be implemented in the form of a portable digital radiography (DR) machine, with visible light sensor(s) 112 coupled to the medical imaging sensor(s) 114 components of the DR machine.

Figure 2:
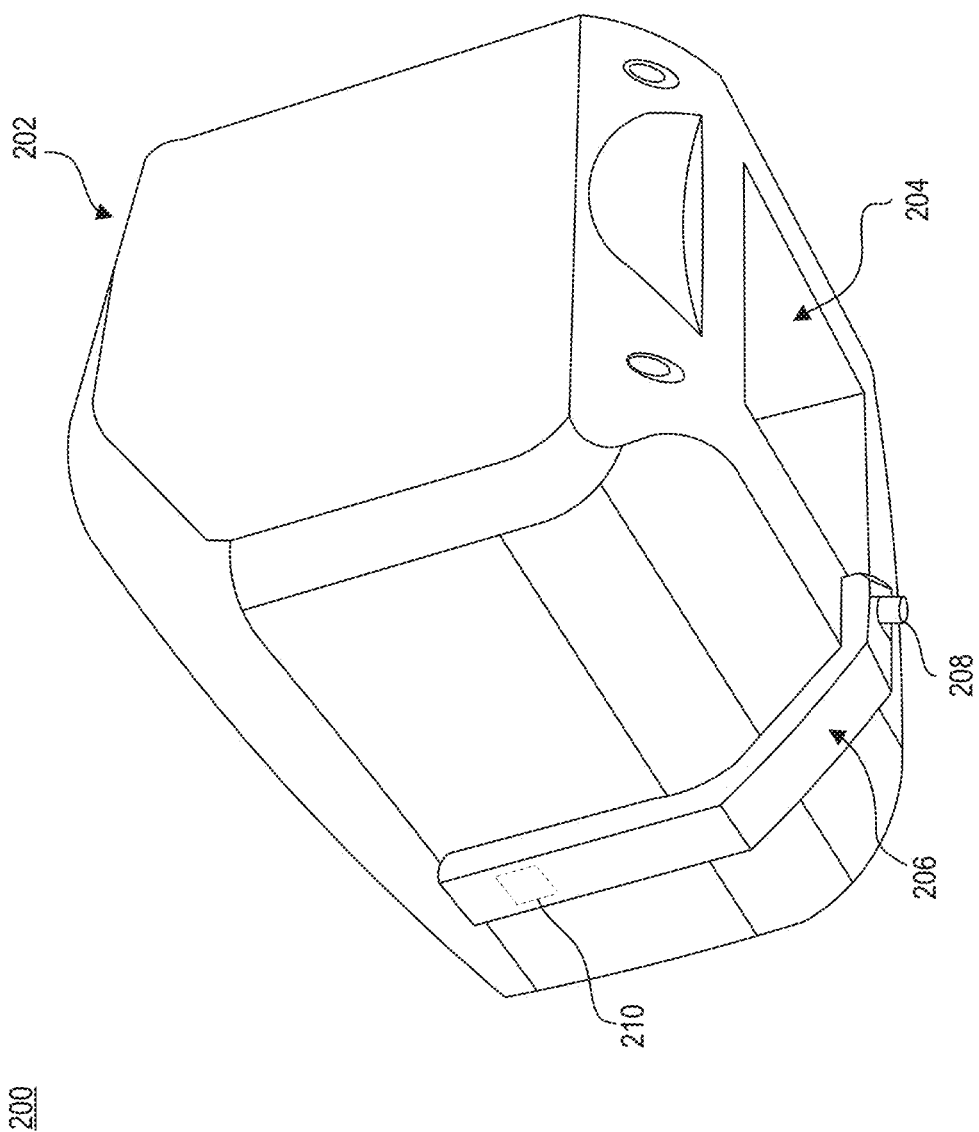
FIG. 2 illustrates an example interoceptive sensor coupled to a medical image sensor.

Attention is briefly directed to FIG. 2, which illustrates an example isolated representation of an X-ray head 202 of a portable DR machine 200 (other components such as wires, handles, etc. are omitted for clarity). The portable DR machine 200 may comprise a radiography system 122 as discussed hereinabove with reference to FIG. 1. The X-ray head 202 includes an X-ray source 204 for emitting X-ray radiation to facilitate radiograph acquisition. The X-ray source 204 (combined with an X-ray detector, which may be arranged behind an imaging subject relative to the X-ray source 204) may comprise medical imaging sensor(s) 114 as described above with reference to FIG. 1. FIG. 2 also illustrates an example camera system 206 associated with the portable DR machine 200. The camera system 206 includes an image sensor 208 (e.g., visible light sensor(s) 112, discussed hereinabove with reference to FIG. 1) and internal components 210. The internal components 210 may comprise various components associated with control of the image sensor 208, such as processor(s) 102 and/or storage 104, discussed hereinabove with reference to FIG. 1. In some instances, the internal components 210 comprise one or more interoceptive sensors, such as an accelerometer 116 which may be enclosed within a casing of the camera system 206 that is mounted/mountable to the X-ray head 202. The camera system 206 may accordingly comprise or be associated with accelerometer(s) to obtain information about the orientation of the camera system 206 before, during, or after image acquisition. Such orientation information may indicate the imaging subject's orientation (e.g., upright, lying down, or semi-upright) during image acquisition.

FIG. 2 illustrates the camera system 206 is mounted or coupled to the X-ray head 202, thereby enabling easy use of the camera system 206 in conjunction with the X-ray head 202. For example, a medical imaging session may include capturing visible light images of a patient (utilizing the camera system 206) before, substantially contemporaneous with, or after capturing X-ray images of the patient (utilizing the X-ray source 204 and an X-ray detector).

Although not illustrated in FIG. 2, a portable DR machine 200 may additionally or alternatively comprise an accelerometer(s) 116. The accelerometer(s) 116 may be mounted to the X-ray head 202, to another portion of the portable DR machine 200, or be uncoupled from the portable DR machine 200. In some instances, the accelerometer(s) 116 is/are part of the camera system 206 (e.g., part of the internal components 210, as discussed above). The accelerometer(s) 116 may determine a patient's orientation while capturing of medical images (and/or visible light images) of the patient pursuant to a medical imaging session for the patient. As will be described in more detail hereinafter, accelerometer(s) 116 may additionally or alternatively be positioned on a detector associated with a medical imaging sensor (e.g., on an X-ray detector associated with a portable DR machine 200, which may be arranged behind a patient).

One will appreciate, in view of the present disclosure, that visible light sensor(s) 112 may be mounted to, coupled with, or otherwise integrated into or associated with other types of medical imaging sensors, such as CT devices, MRI devices, ultrasound devices, etc.

Medical images (e.g., captured via the X-ray source 204 and an X-ray detector of the portable DR machine 200), visible light images (e.g., captured utilizing the camera system 206), and image subject's orientation (e.g., determined based upon sensor data of the accelerometer(s) 116) acquired pursuant to a medical imaging session for a particular patient may be stored in association with one another in the particular patient's data. For example, FIG. 1 shows that the radiography system(s) 122, the MRI system(s) 124, the ultrasound system(s) 126, and/or the other system(s) 128 may be in communication with a network 130. The network 130 may comprise one or more links that enable the transport of information between and/or among systems, modules, and/or devices. FIG. 1 also illustrates server(s) 132 in communication with the network 130 and therefore in communication with the radiography system(s) 122, the MRI system(s) 224, the ultrasound system(s) 126, and/or the other system(s) 128. The server(s) 132 may comprise any of the components discussed hereinabove with reference to FIG. 1, such as processor(s) 102, storage 104, I/O system(s) 118, communication system(s) 120, etc.

The server(s) 132 may be configured to receive and store information from the radiography system(s) 122, the MRI system(s) 124, the ultrasound system(s) 126, and/or the other system(s) 128 in association with particular patients. The server(s) 132 may thus operate similar to a patient database and/or a picture archiving and communication system (PACS). For example, a radiography system 122 (e.g., portable DR machine 200) may be utilized to capture one or more X-ray images, visible light images, and subject orientation of a human patient named "Einstein, Albert" pursuant to a medical imaging session for "Einstein, Albert". The server(s) 132 may receive and store the medical images, visible light images, and/or subject orientation information (e.g., over the network 130 via communication system(s) 120) in association with the identity of "Einstein, Albert" such that the information becomes accessible to make diagnostic, treatment, and/or other decisions for "Einstein, Albert" (one will appreciate that other patient identifiers in addition to patient name may be used, such as birthday, medical record number, etc.) As will be described in more detail hereinbelow, the storage of patient orientation information in association with medical images and/or visible light images may contribute to facilitating avoidance or errors in medical imaging (e.g., misdiagnosis of leaked bowel).

Figure 3A:
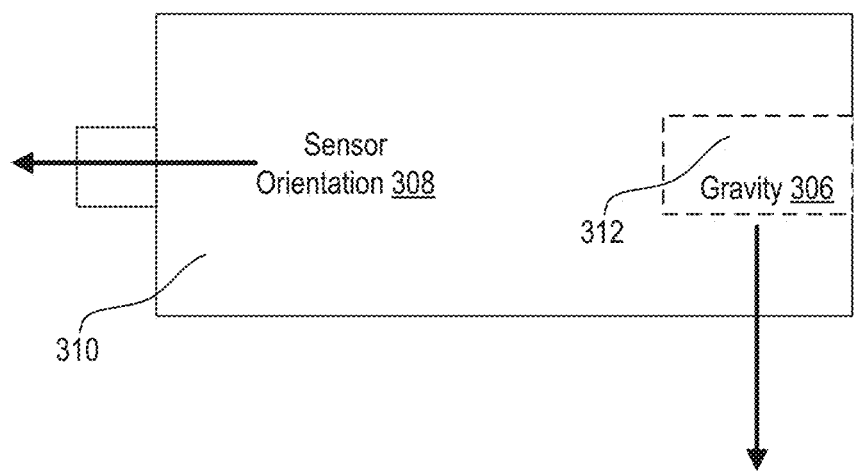
FIG. 3A and FIG. 3B illustrate an example accelerometer coupled to a medical imaging device.
Figure 3B:
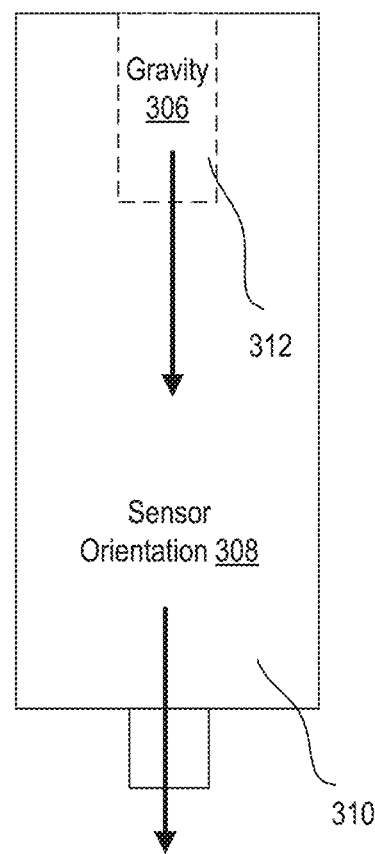

FIG. 3A and FIG. 3B illustrate an example accelerometer 312 associated with a medical imaging device 310. As noted above, the accelerometer 312 may be directly integrated into the medical imaging device 310 or indirectly connected to the medical imaging device 310 (e.g., where the accelerometer 312 is part of a camera system that is mounted to the medical imaging device 310 after manufacturing of the medical imaging device 310 in an after-market manner). As depicted in FIG. 3A, sensor data obtained via the accelerometer 312 may be used to determine the direction of earth's gravitational force exerted on the accelerometer 312 (indicated in FIG. 3A by gravity 306; it will be appreciated that an accelerometer at rest may indicate an upward acceleration responsive to earth's downward gravitational force). FIG. 3A also illustrates sensor orientation 308 of the medical imaging device 310, which may comprise a fixed orientation relative to accelerometer 312 based upon the fixed positioning of the accelerometer 312 on the medical imaging device 310. Comparing the direction of gravity 306 (as measured by the accelerometer 312) to the sensor orientation 308 (according to the fixed positional relationship between the accelerometer 312 and the medical imaging device 310) may provide an indication of the orientation of the medical imaging device 310 for capturing medical images.

For example, when gravity 306 and the sensor orientation 308 are substantially perpendicular, as shown in FIG. 3A, the medical imaging device 310 may be regarded as being positioned to capture medical images from a substantially horizontal sensor orientation. Such positioning of the medical imaging device 310 may indicate that imaging subjects captured by the medical imaging device 310 are vertically arranged (e.g., upright) for the image acquisition. For instance, for a chest or abdomen X-ray, patients are usually arranged with their frontal plane facing away from the X-ray device and facing toward the imaging plate. Thus, at least for certain types of medical imaging/images, an imaging subject may be inferred to be sitting or standing upright (with their frontal plane perpendicular to the medical imaging device) when imaged by a medical imaging device 310 determined to be substantially horizontal during the imaging (e.g., based upon sensor data of the accelerometer 312 indicating gravity 306 and known sensor orientation 308 relative to the accelerometer 312, as shown/discussed with reference to FIG. 3A).

As another example, when gravity 306 and the sensor(s) orientation 308 are substantially parallel, as shown in FIG. 3B, the medical imaging device 310 may be regarded as being positioned to capture medical images from a substantially vertical (e.g., downward-facing) sensor orientation. Such positioning of the medical imaging device 310 may indicate that imaging subjects captured by the medical imaging device 310 are horizontally arranged (e.g., lying down) for the image acquisition (e.g., with their frontal plane facing the medical imaging device 310, as discussed above).

In some implementations, sensor data obtained from one or more accelerometers associated with a detector (e.g., an X-ray detector) are additionally or alternatively used to determine subject orientation during imaging. For instance, detector orientation relative to gravitational force or acceleration direction may be indicative of subject orientation during imaging (e.g., where the type of imaging being performed indicates a particular patient orientation relative to the detector). In some implementations, multiple accelerometers associated with different imaging components (e.g., medical imaging emitter, medical imaging detector, visible light imaging sensor, etc.) are used in combination with one another to determine imaging subject orientation.

In some instances, the type of medical imaging performed is used in combination with the accelerometer data and/or medical image sensor orientation relative to the accelerometer to determine the orientation of imaging subjects. For instance, different types of images (e.g., chest X-rays, head x-rays, etc.) or imaging devices may be associated with different patient orientations relative to the medical image sensor (e.g., with the patient's sagittal plane, frontal plane, or axial/transverse plane facing the medical imaging device). Such information (e.g., imaging device type, type of medical image acquired, etc.) may be used as input for determining patient orientation. For instance, where a medical imaging device 310 is determined to be or have been horizontally arranged for image acquisition (e.g., as shown in FIG. 3A), (i) if the type of medical image type captured is one that is commonly associated with patients' transverse planes facing the image sensor, a "lying" or "horizontal" patient orientation may be selected for association with the acquired medical images, whereas (ii) if the type of medical image type captured is one that is commonly associated with patients' frontal planes facing the image sensor, an "upright" or "vertical" patient orientation may be selected for association with the acquired medical images.

One will appreciate, in view of the present disclosure, that the particular medical imaging device 310 orientations (and/or patient orientations) shown and/or described with reference to FIGS. 3A and 3B are provided by way of example only and are not limiting of the present disclosure. By way of non-limiting example, a range of angular offsets between gravity 306 and sensor orientation 308 may be associated with a "vertical" or "upright" patient orientation such as angular offsets within a range of ±10 degrees of perpendicular. Similarly, as another non-limiting example, a range of angular offsets between gravity 306 and sensor orientation 308 may be associated with a "horizontal" or "lying down" patient orientation, such as angular offsets with a range of ±10 degrees of parallel. Furthermore, other patient orientation designations aside from those explicitly shown and/or described hereinabove are within the scope of the present disclosure, such as "semi-upright" For instance, an example of a "semi-upright" patient orientation may be associated with an angular offset between the sensor(s) orientation 308 and gravity 306 that is outside of ranges associated with "vertical", "upright", "horizontal", or "lying" patient orientation designations.

Figure 4:
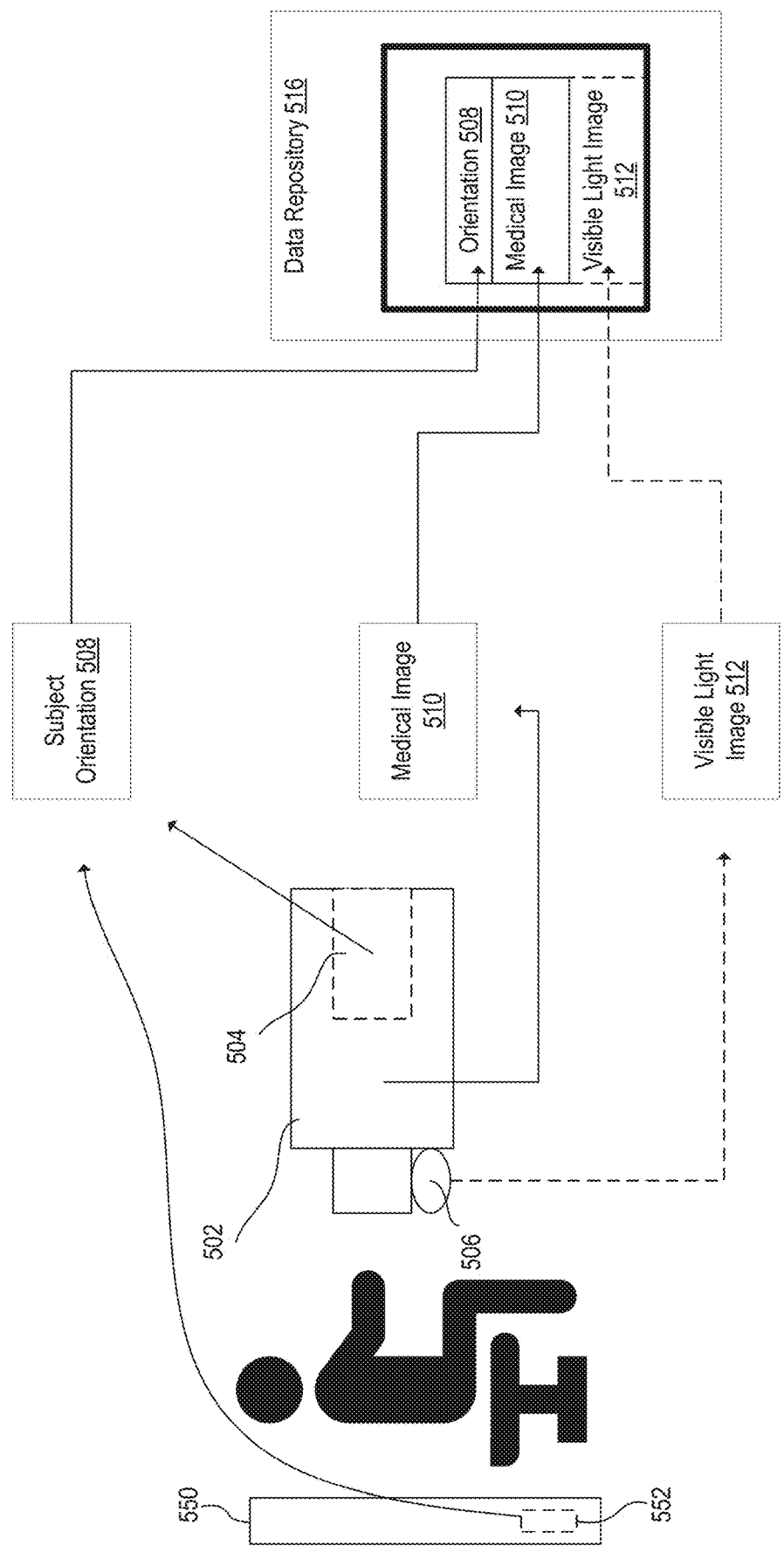
FIG. 4 illustrates a conceptual representation of creating and storing medical data that is associated with subject orientation data.

FIG. 4 illustrates a conceptual representation of creating and storing medical data that is associated with subject orientation data. In particular, FIG. 4 illustrates an example representation of preparation for an imaging session, in which a patient is sitting down for the medical imaging (e.g., utilizing a portable DR machine 502). Although FIG. 4 shows the patient in an upright position, the patient may be in an alternative orientation (e.g., a lying down position or a semi-upright position). FIG. 4 depicts an accelerometer 504 associated with the portable DR machine 502, which acquires sensor data usable for determining a subject orientation 508. For example, the sensor data obtained by the accelerometer 504 may indicate that the direction of gravitational force (or the direction of gravitational acceleration) is substantially perpendicular to the orientation of the image sensing portion of the portable DR machine 502 (based on the known positioning of the image sensing portion of the portable DR machine 502 relative to the accelerometer 504). Such an angular relationship, determined based on the accelerometer data, may indicate that a patient would be oriented vertically or upright in order for their frontal plane to aligned with the image sensing portion of the portable DR machine 502. The subject orientation 508 may be obtained based upon this information (as noted above, different body planes, imaging protocol, or other information may be used to determine the subject orientation 508 in addition to accelerometer data).

FIG. 4 also depicts an accelerometer 552 associated with a detector 550 (e.g., an X-ray detector configured to detect X-rays emitted by the portable DR machine 502), which acquires sensor data usable for determining the subject orientation 508. For example, the sensor data obtained by the accelerometer 552 may indicate that the direction of gravitational force (or the direction of gravitational acceleration) is substantially perpendicular to the orientation of the detection plane/portion of the detector 550 (based on the known positioning of the detection plane/portion relative to the accelerometer 552). Such an angular relationship, determined based on the accelerometer data of the accelerometer 552, may indicate that a patient would be oriented vertically or upright in order for their frontal plane to face the detection plane/portion of the detector 550. The subject orientation 508 may be obtained based upon this information (as noted above, different body planes, imaging protocol, or other information may be used to determine the subject orientation 508 in addition to accelerometer data). In the example of FIG. 4, the subject orientation 508 may be determined using accelerometer data from either accelerometer 504 or accelerometer 552, or a combination thereof. In some implementations, utilizing accelerometer data from multiple devices may improve the interpretability of captured imagery (e.g., where an X-ray head is horizontal, but a patient is leaning back or semi-upright with the X-ray detector positioned behind the patient, orientation information for both the X-ray head and the X-ray detector may be useful for an interpreting physician to understand the context of the imaging session).

Figure 5:
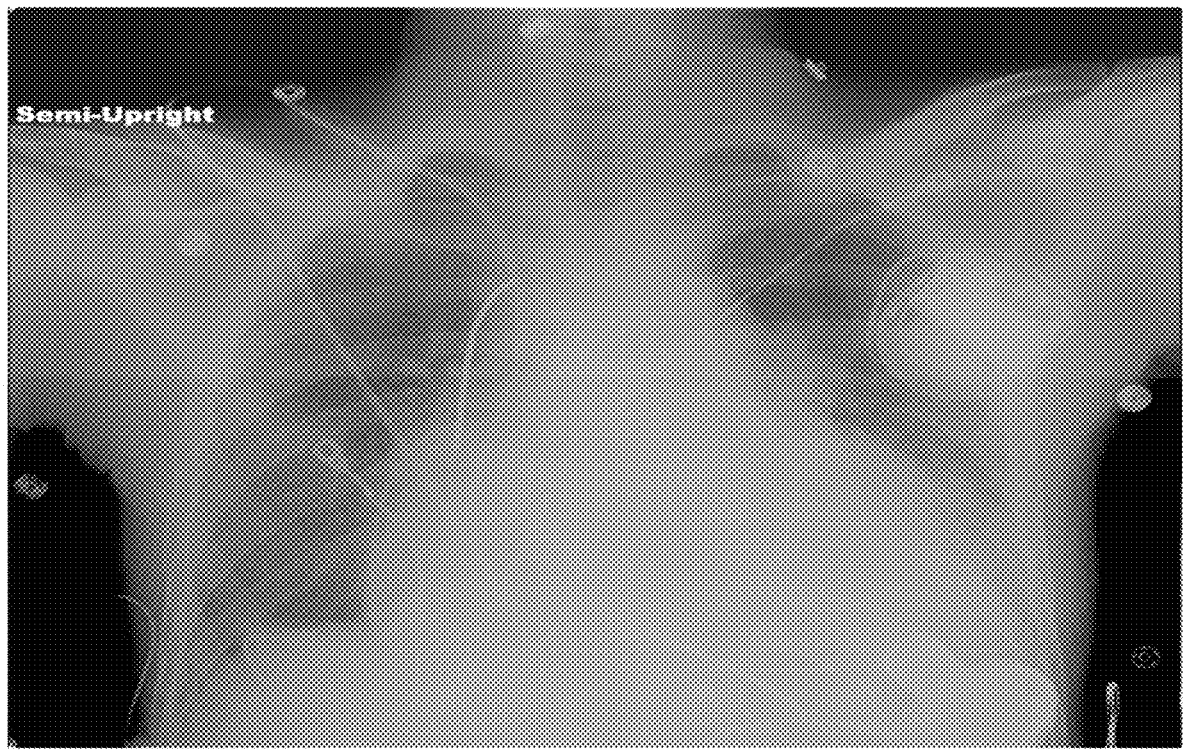
FIG. 5 illustrates an example of a medical image and associated patient orientation information.

FIG. 4 furthermore illustrates a medical image 510 captured by the medical imaging device(s) (such as a portable DR machine 502) while the patient is oriented according to the subject orientation 508 as discussed above. FIG. 4 depicts the medical image 510 being stored in association with the subject orientation 508 within a data repository 516 (as indicated in FIG. 4 by the bolded box encompassing the subject orientation 508 and the medical image 510 within the data repository 516). The data repository 516 may be a server (e.g., server(s) 132) and/or any other type of storage system or structure appropriate to store medical image and subject orientation data. The subject orientation 508 (or any information based thereupon) may be stored in association with the medical image 510 within the data repository 516 in a variety of ways. For instance, the subject orientation 508 may be stored as metadata for a medical image 510 data file. As another example, the subject orientation 508 may be implemented into the image data of the medical image 510. Referring briefly to FIG. 5, an example medical image of a chest X-ray is shown with the subject orientation designation of "Semi-Upright" embedded into the image data of the chest X-ray.

As yet another example, the subject orientation 508 may be stored at a location or in a form that is not specifically part of the medical image 510 data file, image data, or metadata, but is associated with the medical image 510 in some other way, such as by recording the subject orientation within a patient medical record document or PACS data item with a link or structural tie associating the recorded subject orientation 508 with the medical image 510 (e.g., by both the subject orientation 508 and the medical image 510 being associated with the same patient, with the same image acquisition timepoint, with the same imaging study, etc.).

FIG. 4 furthermore illustrates a visible light sensor(s) 506 associated with the portable DR machine 502. In some instances, the visible light sensor(s) 506 may also be used to capture a visible light image 512 of the patient. In some implementations, the visible light image 512 is additionally or alternatively stored in association with the subject orientation 508 (e.g., in addition to the medical image 510) within the data repository 516. One will appreciate, in view of the present disclosure, that information usable to determine subject orientation 508 (e.g., accelerometer data, device orientation/pose information, etc.) may additionally or alternatively be stored in association with a medical image 510 and/or visible light image 512.

Figure 6:
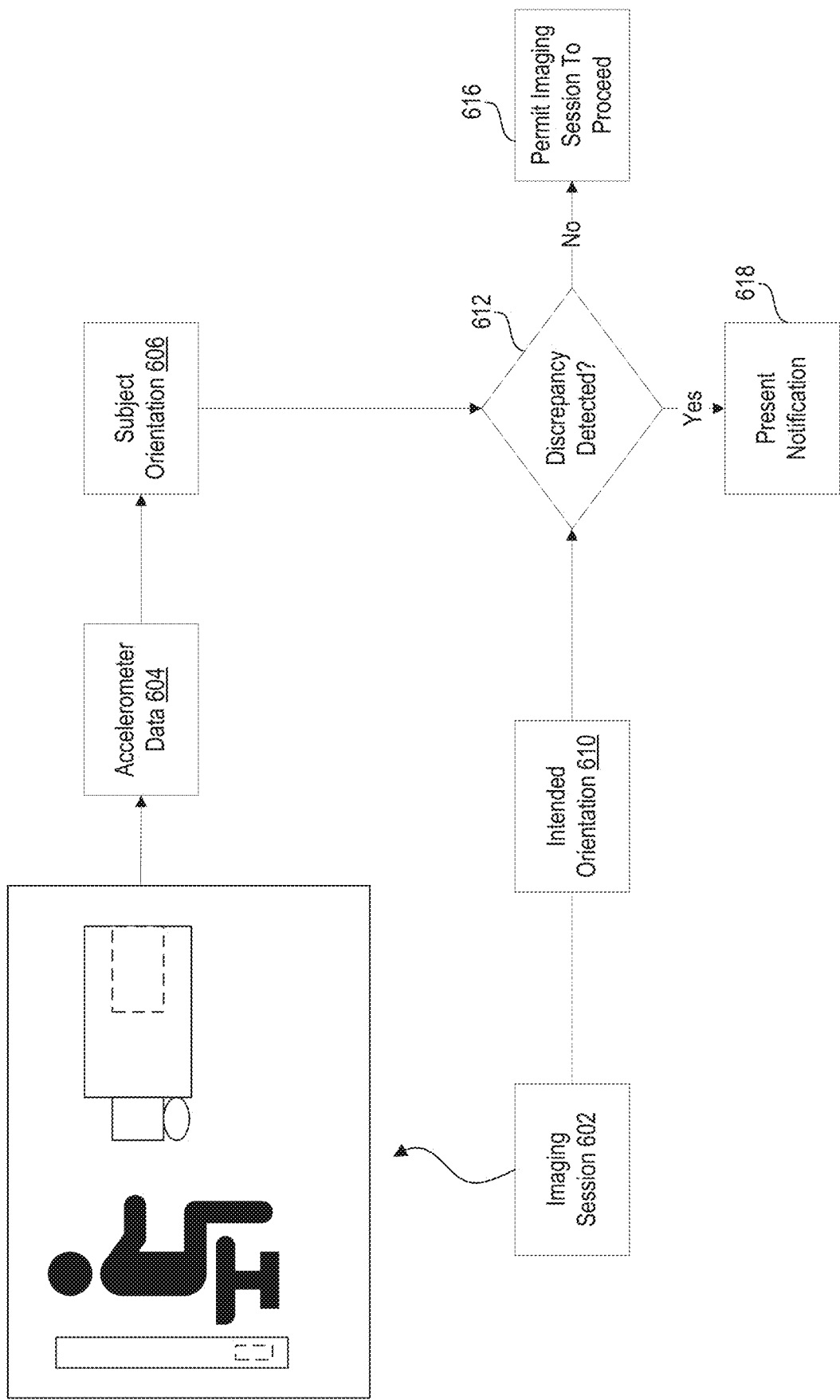
FIG. 6 illustrates a conceptual representation of preventing patient orientation errors.

FIG. 6 illustrates a conceptual representation of preventing patient orientation errors, such as by preventing medical imaging technologists from capturing a medical image that fails to accord with a predefined patient orientation for an imaging session. FIG. 6 illustrates an example representation of preparation for an imaging session 602, in which a patient is arranged in an upright position.

In the depiction of preparation for the imaging session 602 in FIG. 6, no medical imagery has yet been captured. FIG. 6 includes an intended orientation 610, which may guide the preparation for the imaging session 602 as shown in FIG. 6. For instance, a medical image may be desired and/or needed for a particular medical diagnosis and/or treatment and this medical image may require specific patient orientation defined by the intended orientation 610. A technologist may then utilize the intended orientation 610 to arrange the medical imaging system (e.g., a portable DR machine 200) and patient to capture medical imagery of the patient according to the intended patient orientation 610.

Patient orientation errors sometimes arise, however, when a technologist incorrectly interprets or incorrectly carries out intended orientation 610 for a medical imaging session 602. For example, where the intended orientation 610 indicates that imaging is to be performed in an upright position, a technologist may inadvertently lay the patient down, which may result in an orientation error and result in other downstream consequences. Similarly, where the intended orientation 610 indicates that imaging is to be performed with the patient lying down, a technologist may inadvertently arrange the patient upright, which may result in an orientation error.

To prevent such orientation errors, an interoceptive sensor (e.g., an accelerometer associated with a portable DR machine 300, such as with a visible light image sensor, X-ray source, X-ray detector, etc.) associated with a medical imaging device (directly or indirectly) may be utilized to obtain accelerometer data 604 when the medical imaging device (and the patient) is arranged for the imaging session 602 (e.g., by a technologist). A subject orientation 606 may be determined based upon the accelerometer data, as discussed hereinabove (e.g., using a known relative orientation of an imaging portion of the medical imaging device to the accelerometer, using medical image type information, etc.). In the example shown in FIG. 6, the subject orientation 606 would indicate the patient is in an upright position. The subject orientation 606 may be determined prior to any acquisition of medical images for the imaging session 602 and may therefore be regarded as "initial subject orientation".

In the example of FIG. 6, the subject orientation 606 may be compared to the intended orientation 610 to determine whether a discrepancy exists, in accordance with decision block 612 of FIG. 6. When no discrepancy is detected between the subject orientation 606 and the intended orientation 610 (e.g., the subject orientation 606 indicated an "upright position" and the intended orientation 610 indicates an intended orientation of an "upright position"), the imaging session 602 may be permitted to proceed, in accordance with act 616 of FIG. 6 (e.g., medical imaging acquisition functionality for the medical imaging system may be conditioned on detecting no discrepancy between the intended orientation 610 and the subject orientation 606, and/or a notification may be presented indicating that a technologist may proceed with the medical imaging session 602).

In contrast, when a discrepancy is detected between the subject orientation 606 and the intended orientation 610 (e.g., the subject orientation 606 indicates an "upright position" and the intended orientation 610 indicates a "lying down position" or some other orientation), a notification may be presented, in accordance with act 618 of FIG. 6. The notification may take on various forms, such as an audible alert and/or a visual alert provided on a user interface associated with the medical imaging system to prevent the technologist from proceeding with the imaging session 602. Additionally, or alternatively, the medical imaging system may enter or remain in a locked state preventing the imaging session 602 from proceeding when a discrepancy is detected between the subject orientation 606 and the intended orientation 610. Such functionality may thus advantageously prevent wrong orientation errors from being recorded in patient medical image databases.

One will appreciate, in view of the discussion of FIG. 6, that "subject orientation" need not be specifically determined to implement the techniques associated with the discussion of FIG. 6. For example, an intended orientation 610 may comprise an intended orientation of visible light imaging component(s) and/or medical imaging component(s) (e.g., an X-ray head and/or X-ray detector), and the accelerometer data 604 may indicate the (initial) orientation of the visible light imaging component(s) and/or medical imaging component(s). Discrepancies detected between the (initial) orientation of the visible light imaging component(s) and/or medical imaging component(s) and the intended orientation of the visible light imaging component(s) and/or medical imaging component(s) may be detected in accordance with decision block 612 and actions according to blocks 618 or 616 may be taken based on whether discrepancies exist.

The functionality discussed with reference to FIG. 6 may facilitate various benefits, such as in the area of ultrasound imaging. For instance, many ultrasound imaging sessions are driven by templates, which define sequences of bodily structures to be imaged by technologists (e.g., moving from liver to bile ducts to gall bladder to pancreas to right kidney, etc.). Such templates often define an imaging orientation (e.g., an "intended orientation") to be used while imaging the bodily structure (e.g., for the right kidney, the template may indicate transverse still images followed by a transverse cine clip followed by longitudinal still images followed by a longitudinal clip, etc.). Compliance with the imaging orientations defined by the template may be enforced utilizing the techniques discussed hereinabove with reference to FIG. 6. For example, if a technologist neglects to acquire an image called for by the template or acquires an image that fails to comply with the orientation specified in the template, the technologist may be prompted to cure the error. If a particular image and/or orientation is/are not possible to obtain, the technologist may document the limitation within the imaging protocol.

Although the present disclosure has focused, in at least some respects, on utilizing one or more accelerometers to determine patient orientation, other types of interoceptive sensors may be utilized, such as gyroscope(s) (e.g., utilizing angular velocity to detect changes in orientation from a starting point to determine imaging device orientation), magnetometer(s) (e.g., utilizing directional deviation from North to determine imaging device orientation), and/or others. Furthermore, although the present disclosure has focused, in at least some respects, on implementations in which a subject orientation is inferred based upon interoceptive sensor data, it will be appreciated, in view of the present disclosure, that the principles described herein may be carried out without a specific inference of subject orientation. For example, a designation of imaging device orientation may be stored in association with a medical and/or visible light image, which may itself assist in interpretation of medical imagery.

Example Method(s) for Determining Imaging Subject Orientation

The following discussion now refers to a number of methods (e.g., computer-implementable or system-implementable methods) and/or method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 7:
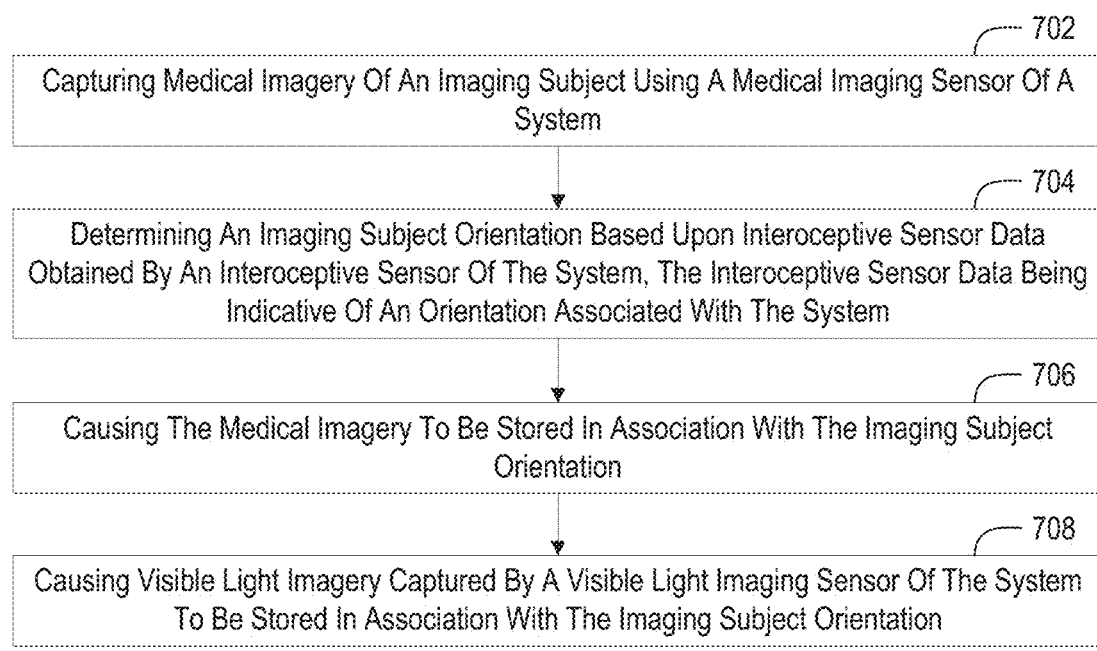
FIG. 7 illustrates an example flow diagram depicting acts associated with determining imaging subject orientation.

FIG. 7 illustrates an example flow diagram 700 depicting acts associated with determining imaging subject orientation.

Act 702 of flow diagram 700 of FIG. 7 includes capturing medical imagery of an imaging subject using a medical imaging sensor of a system. In some instances, act 702 is performed utilizing processor(s) 102, storage 104, sensor(s) 110, I/O system(s) 118, communication system(s) 120, and/or other components of radiography system(s) 122, MRI system(s) 124, ultrasound system(s) 126, server(s) 132, and/or other system(s) 128. In some instances, the medical imaging sensor comprises a radiography imaging system.

Act 704 of flow diagram 700 of FIG. 7 includes determining an imaging subject orientation based upon interoceptive sensor data obtained by an interoceptive sensor of the system, the interoceptive sensor data being indicative of an orientation associated with the system. In some instances, act 704 is performed utilizing processor(s) 102, storage 104, sensor(s) 110, I/O system(s) 118, communication system(s) 120, and/or other components of radiography system(s) 122, MRI system(s) 124, ultrasound system(s) 126, server(s) 132, and/or other system(s) 128. In some instances, the imaging subject orientation indicates whether the imaging subject is in an upright position, semi-upright, or in a lying position.

Act 706 of flow diagram 700 of FIG. 7 includes causing the medical imagery to be stored in association with the imaging subject orientation. In some instances, act 706 is performed utilizing processor(s) 102, storage 104, sensor(s) 110, I/O system(s) 118, communication system(s) 120, and/or other components of radiography system(s) 122, MRI system(s) 124, ultrasound system(s) 126, server(s) 132, and/or other system(s) 128. In some instances, causing the medical imagery to be stored in association with the imaging subject orientation comprises storing the imaging subject orientation as metadata of the medical imagery. In some implementations, causing the medical imagery to be stored in association with the imaging subject orientation comprises implementing the imaging subject orientation into image data of the medical imagery. In some instances, causing the medical imagery to be stored in association with the imaging subject orientation comprises including the imaging subject orientation in a document associated with the medical imagery.

Act 708 of flow diagram 700 of FIG. 7 includes causing visible light imagery captured by a visible light imaging sensor of the system to be stored in association with the imaging subject orientation. In some instances, act 708 is performed utilizing processor(s) 102, storage 104, sensor(s) 110, I/O system(s) 118, communication system(s) 120, and/or other components of radiography system(s) 122, MRI system(s) 124, ultrasound system(s) 126, server(s) 132, and/or other system(s) 128.

FIG. 8 illustrates an example flow diagram 800 depicting acts associated with preventing errors in medical imaging.

Act 802 of flow diagram of FIG. 8 includes determining an imaging subject orientation of an imaging subject based upon interoceptive sensor data obtained by an interoceptive sensor of a system, the system further comprising a medical imaging sensor configured to capture medical imagery of the imaging subject. In some instances, act 802 is fully or partially performed utilizing processor(s) 102, storage 104, sensor(s) 110, I/O system(s) 118, communication system(s) 120, and/or other components of radiography system(s) 122, MRI system(s) 124, ultrasound system(s) 126, server(s) 132, and/or other system(s) 128. The interoceptive sensor may comprise an accelerometer.

Act 804 of flow diagram 800 includes accessing an indication of an intended imaging subject orientation, the intended imaging subject orientation being selected to be embodied by the imaging subject to be imaged during an imaging session using the medical sensor. In some instances, act 804 is performed utilizing processor(s) 102, storage 104, sensor(s) 110, I/O system(s) 118, communication system(s) 120, and/or other components of radiography system(s) 122, MRI system(s) 124, ultrasound system(s) 126, server(s) 132, and/or other system(s) 128. In some instances, the imaging session comprises capturing medical imagery of the imaging subject using the medical imaging sensor. In some instances, the imaging session further comprising capturing visible light imagery of the imaging subject using a visible light imaging sensor of the system. In some instances, the imaging subject orientation and the intended imaging subject orientation indicate an upright position or a lying position.

Act 806 of flow diagram 800 includes, in response to determining a discrepancy between the intended imaging subject orientation and the imaging subject orientation, causing presentation of a notification on a user interface. In some instances, act 806 is performed utilizing processor(s) 102, storage 104, sensor(s) 110, I/O system(s) 118, communication system(s) 120, and/or other components of radiography system(s) 122, MRI system(s) 124, ultrasound system(s) 126, server(s) 132, and/or other system(s) 128.

Act 808 of flow diagram 800 includes, in response to determining that no discrepancies exist between the intended imaging subject orientation and the imaging subject orientation, permit the imaging session to proceed or commence. In some instances, act 808 is performed utilizing processor(s) 102, storage 104, sensor(s) 110, I/O system(s) 118, communication system(s) 120, and/or other components of radiography system(s) 122, MRI system(s) 124, ultrasound system(s) 126, server(s) 132, and/or other system(s) 128. In some instances, act 808 further includes causing the medical imagery to be stored in association with the imaging subject orientation.

Abbreviated List of Defined Terms

To assist in understanding the scope and content of the foregoing and forthcoming written description and appended claims, a select few terms are defined directly below.

The terms "physician", "clinician", "radiologist", and "technologist" as used herein generally refer to any licensed and/or trained person prescribing, administering, or overseeing the diagnosis and/or treatment of a patient or who otherwise tends to the wellness of a patient. This term may, when contextually appropriate, include any licensed medical professional, such as a physician (e.g., Medical Doctor, Doctor of Osteopathic Medicine, etc.), a physician's assistant, a nurse, a nurse practitioner, a medical imaging technician, a dentist, a chiropractor, etc. and includes any physician specializing in a relevant field (e.g., radiology).

The term "patient" generally refers to any animal, for example a mammal, under the care of a healthcare provider, as that term is defined herein, with particular reference to humans under the care of a primary care physician, oncologist, surgeon, or other relevant medical professional. For the purpose of the present application, a "patient" may be interchangeable with an "individual" or "person." In some embodiments, the individual is a human patient.

Additional Details Related to Computing Systems

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the Figures may be combined or used in connection with any content or feature used in any of the other Figures. In this regard, the content disclosed in any one figure is not mutually exclusive and instead may be combinable with the content from any of the other Figures.

CONCLUSION

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatuses disclosed herein may be made without departing from the scope of the disclosure or of the invention. Thus, while various aspects and embodiments have been disclosed herein, other aspects and embodiments are contemplated. All changes that come within the meaning and range of equivalency of the claims are to be embraced within their scope.

What is claimed is:

1. A system for determining imaging subject orientation, comprising:
 a medical imaging sensor, the medical imaging sensor being configured to capture medical imagery of an imaging subject;
 one or more sensors, the one or more sensors comprising one or more accelerometers, one or more gyroscopes, or one or more magnetometers connected to the medical imaging sensor, the one or more sensors being configured to obtain sensor data indicative of an orientation associated with the medical imaging sensor;
 one or more processors; and
 one or more hardware storage devices storing instructions that are executable by the one or more processors to configure the system to:
  determine the imaging subject orientation based upon the sensor data indicating the orientation associated with the medical imaging sensor obtained by the one or more accelerometers, the one or more gyroscopes, or the one or more magnetometers connected to the medical imaging sensor.

2. The system of claim 1, wherein the medical imaging sensor comprises a radiography imaging system.

3. The system of claim 1, further comprising a visible light imaging sensor.

4. The system of claim 3, wherein the visible light imaging sensor is mounted on a casing, and wherein the casing is mounted on or selectively mountable on the medical imaging sensor.

5. The system of claim 4, wherein one or more of the one or more sensors are at least partially enclosed by the casing.

6. The system of claim 1, wherein the instructions are executable by the one or more processors to configure the system to:
cause medical imagery captured by the medical imaging sensor to be stored in association with the imaging subject orientation.

7. The system of claim 6, wherein the imaging subject orientation indicates whether the imaging subject is in an upright position, semi-upright, or in a lying position.

8. The system of claim 6, wherein causing the medical imagery to be stored in association with the imaging subject orientation comprises storing the imaging subject orientation as metadata of the medical imagery.

9. The system of claim 6, wherein causing the medical imagery to be stored in association with the imaging subject orientation comprises embedding the imaging subject orientation into image data of the medical imagery.

10. The system of claim 6, wherein causing the medical imagery to be stored in association with the imaging subject orientation comprises including the imaging subject orientation in a document associated with the medical imagery.

11. The system of claim 6, wherein the instructions are executable by the one or more processors to further configure the system to:
cause visible light imagery captured by a visible light imaging sensor of the system to be stored in association with the imaging subject orientation.

12. The system of claim 1, wherein the instructions are executable by the one or more processors to configure the system to:
access an indication of an intended imaging subject orientation, the intended imaging subject orientation being selected to be embodied by the imaging subject to be imaged during an imaging session; and
in response to determining a discrepancy between the intended imaging subject orientation and the imaging subject orientation, cause presentation of a notification on a user interface.

13. The system of claim 12, wherein the imaging subject orientation and the intended imaging subject orientation indicate an upright position, a lying position, or a semi-upright position.

14. The system of claim 12, wherein the instructions are executable by the one or more processors to further configure the system to:
in response to determining that no discrepancies exist between the intended imaging subject orientation and the imaging subject orientation, permit the imaging session to proceed or commence.

15. The system of claim 14, wherein the imaging session comprises capturing medical imagery of the imaging subject using the medical imaging sensor.

16. The system of claim 15, wherein the instructions are executable by the one or more processors to further configure the system to:
cause the medical imagery to be stored in association with the imaging subject orientation.

17. The system of claim 15, wherein the imaging session further comprising capturing visible light imagery of the imaging subject using a visible light imaging sensor of the system.

18. A method for determining imaging subject orientation, comprising:
capturing medical imagery of an imaging subject using a medical imaging sensor of a system;
determining the imaging subject orientation of the imaging subject based upon sensor data obtained by one or more sensors connected to the medical imaging sensor of the system, wherein the sensor data captures an orientation of the medical imaging sensor, wherein the imaging subject orientation comprises an incline of the imaging subject based upon the orientation of the medical imaging sensor; and
causing the medical imagery to be stored in association with the imaging subject orientation.

19. A method for preventing errors in medical imagery, comprising:
determining an imaging subject orientation of an imaging subject based upon sensor data obtained by one or more sensors connected to a medical imaging sensor of a system, the medical imaging sensor being configured to capture medical imagery of the imaging subject, wherein the sensor data captures an orientation of the medical imaging sensor, wherein the imaging subject orientation comprises an incline of the imaging subject based upon the orientation of the medical imaging sensor;
accessing an indication of an intended imaging subject orientation, the intended imaging subject orientation being an intended incline selected to be embodied by the imaging subject to be imaged during an imaging session using the medical imaging sensor; and
in response to determining a discrepancy between the intended imaging subject orientation and the imaging subject orientation, causing presentation of a notification on a user interface.

* * * * *